Jan. 2, 1923.
H. G. TATOSIAN.
ICE CREAM CONE ROLLING MACHINE.
FILED FEB. 11, 1921.
1,440,851
3 SHEETS-SHEET 1
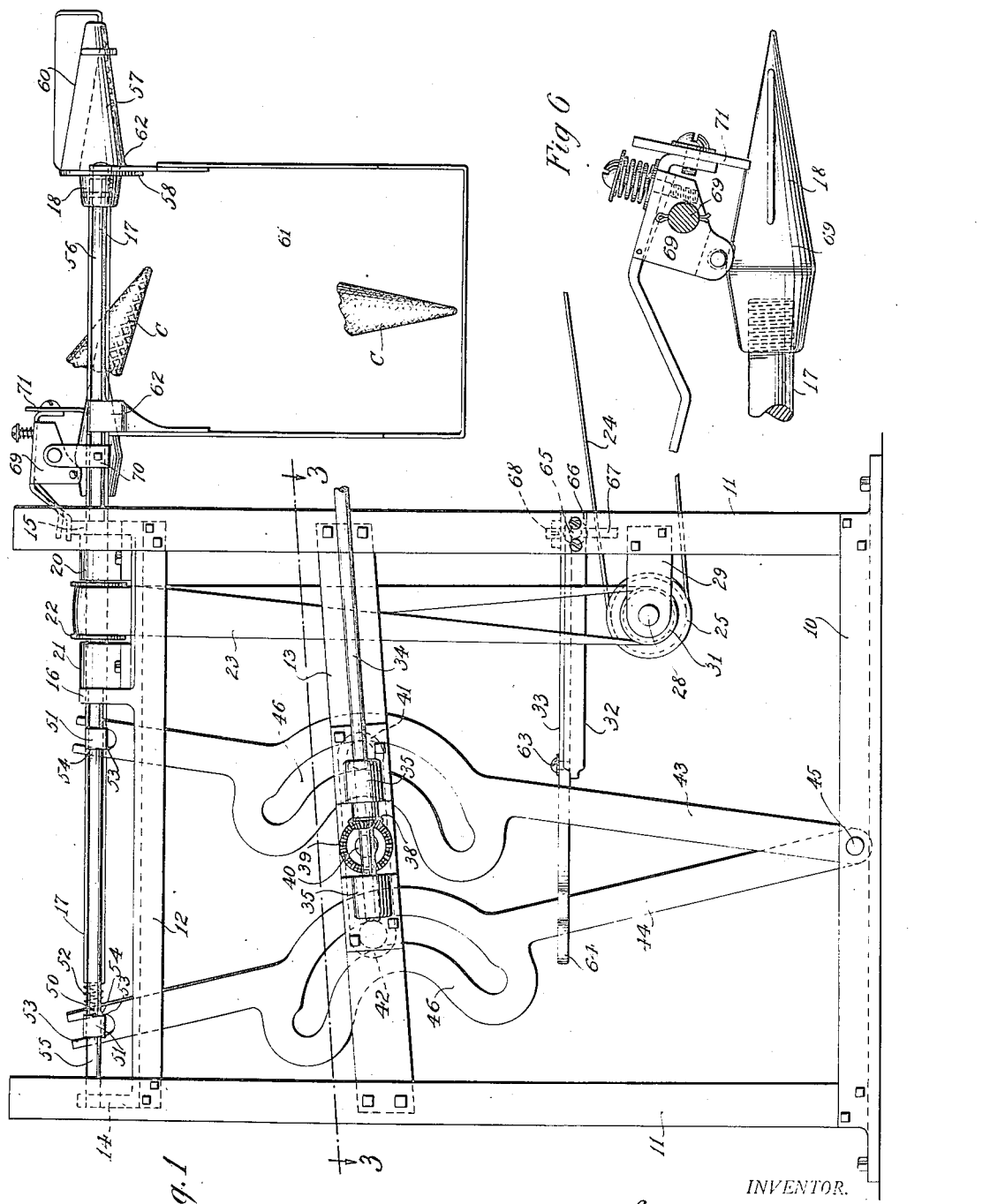
INVENTOR.
Harry G. Tatosian
BY
Chamberlain & Newman ATTORNEYS.

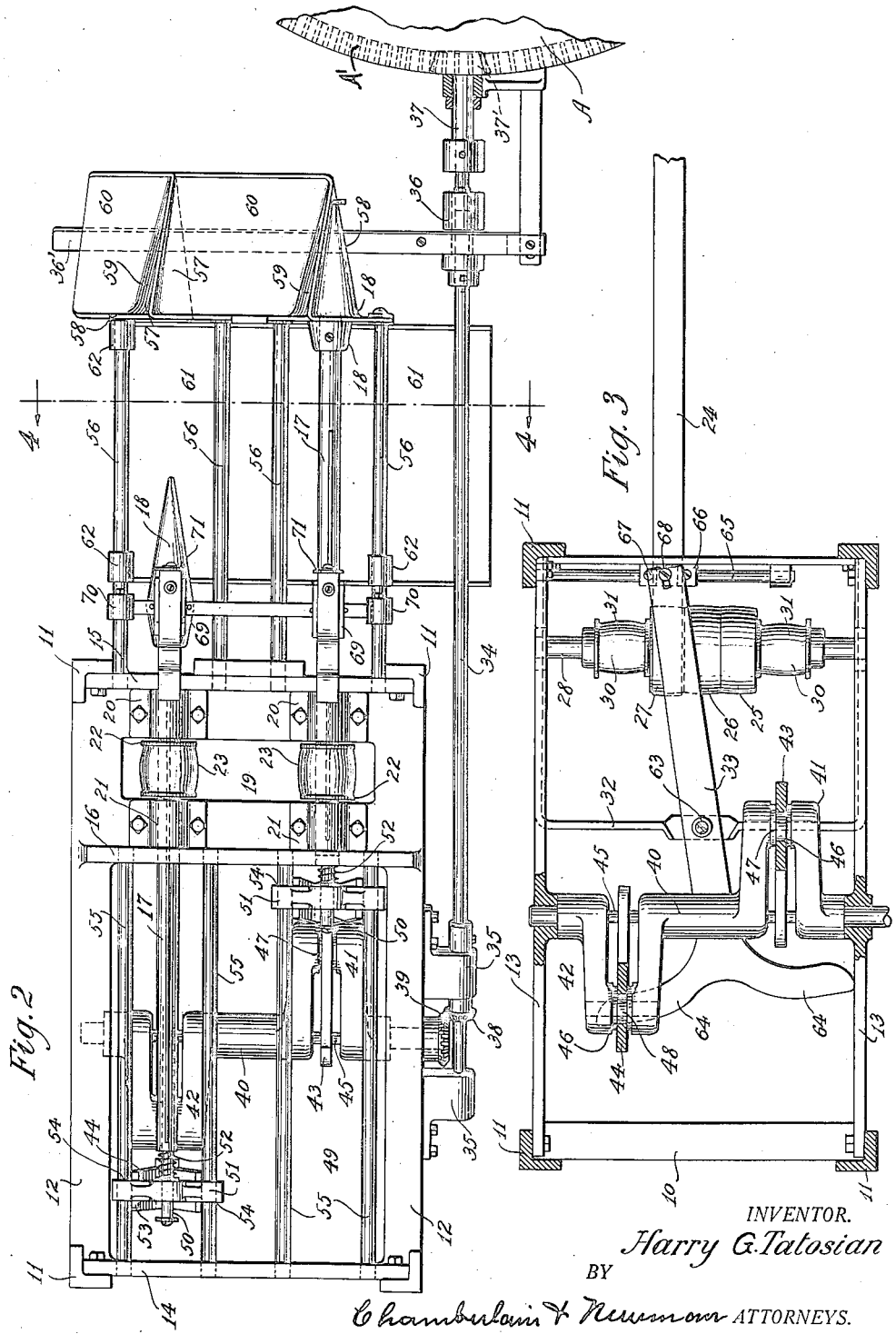

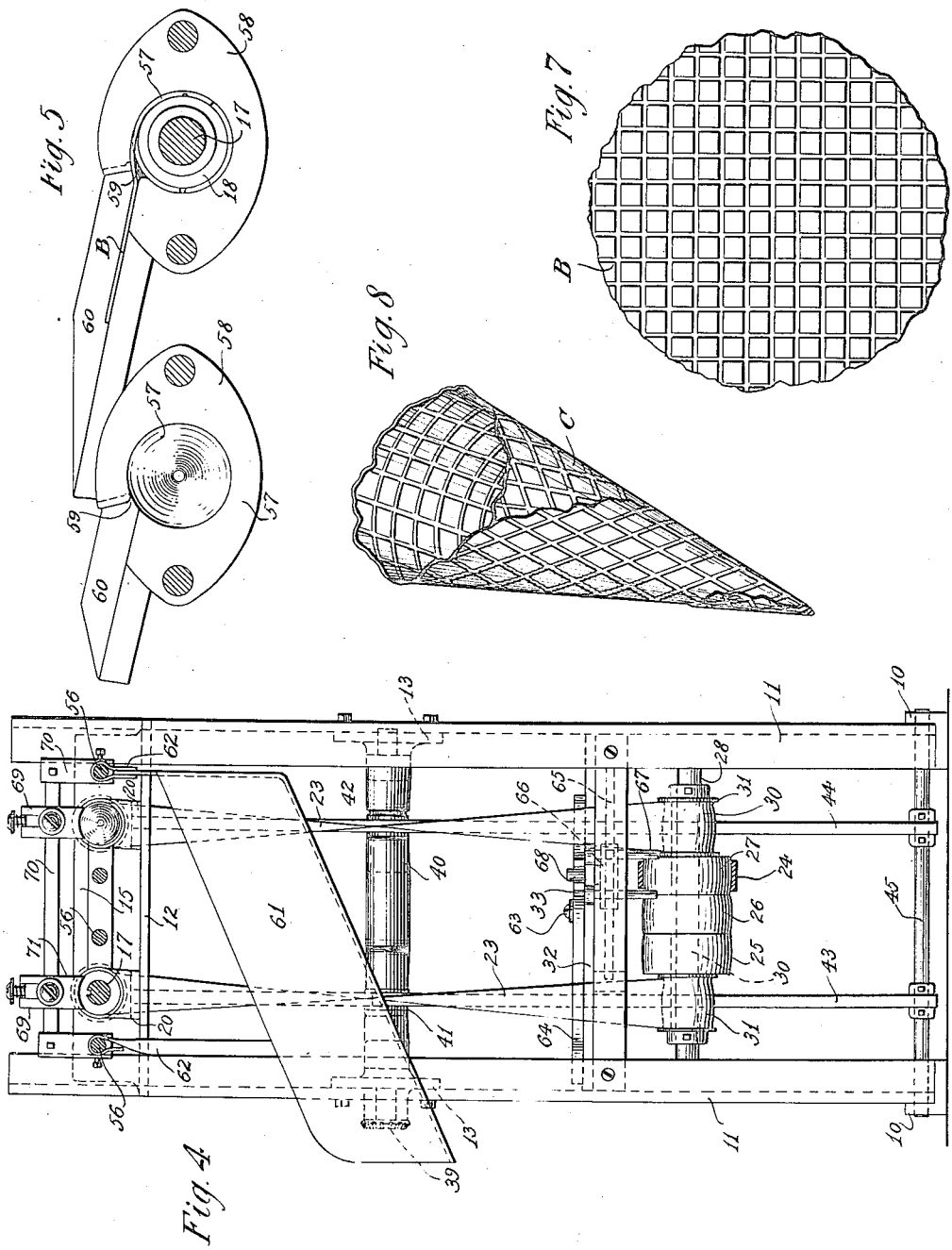

Patented Jan. 2, 1923.

1,440,851

UNITED STATES PATENT OFFICE.

HARRY G. TATOSIAN, OF BRIDGEPORT, CONNECTICUT.

ICE-CREAM-CONE-ROLLING MACHINE.

Application filed February 11, 1921. Serial No. 444,201.

*To all whom it may concern:*

Be it known that HARRY G. TATOSIAN, a citizen of the United States, and resident of Bridgeport, in the county of Fairfield and State of Connecticut, has invented certain new and useful Improvements in Ice-Cream-Cone-Rolling Machines, of which the following is a specification.

This invention relates to improvements in machines for rolling cones particularly adaptable for use as containers for ice cream.

An object of the invention is to provide a machine for forming, by rolling, ice cream cones from baked, pliable cakes while the same are yet warm, and particularly to provide a machine of the present character that can be operated and used in conjunction with a commercial type of rotary cone cake baking machine, and can be connected with said baking machine and so timed that the forming mechanism will be capable of caring for the entire product of the cone cake baking machine with the assistance of a single operator having but a limited amount of experience.

A further important object is to provide a cone rolling machine wherein the cones can be rolled from relatively soft, pliable cakes and the overlapping outer edges thereof can be pressed down against the bodies of the cones and held sufficiently long to cause said edges and bodies to be sealed or united to produce cones which will not open up but will maintain their proper shapes after being discharged from the machine.

A still further important object is to design a machine capable of being connected with and operated by a baking machine of the type already mentioned, and to provide two driving connections between said machines, one a single belt connection from the lower portion of the baking machine and utilized for rotating the spindles which carry the mandrels that assist in forming the cones, and the other a pinion and shaft connection for reciprocating the spindles and mandrels, to move the mandrels into and out of the molds with which they are adapted to co-operate to constitute the cone formers and to withdraw the mandrels to automatically discharge the cones.

The machine, as designed, may be said to be a double machine, including two substantially duplicate, separate sets of rolling mechanism, each comprising a separate mandrel and mold and including a feed table, a stripper, and manipulating means for said mandrel and mold, all of which will later be more fully described.

With the above and other objects in view, the invention resides and consists in the construction, arrangement and combination of parts as now to be fully described and hereinafter specifically claimed, it being understood that such changes in arrangement of parts and details of construction may be made as fall within the spirit of the invention and within the scope of the appended claims.

In the accompanying drawings forming a part of this specification,

Fig. 1 is a side elevational view of a complete machine made in accordance with the principles of the invention;

Fig. 2 is a top plan view corresponding with Fig. 1, but additionally showing in plan a portion of the planetary table of a cone cake baking machine of commercial type;

Fig. 3 is a longitudinal sectional view on line 3—3 in Fig. 1, looking in the direction of the arrows;

Fig. 4 is a vertical sectional view on line 4—4 in Fig. 2, looking in the direction of the arrows showing the chute in elevation;

Fig. 5 is an enlarged sectional view as on line 4—4 in Fig. 2, looking in the opposite direction and showing a cake being wound upon the mandrel;

Fig. 6 is an enlarged detail view showing a mandrel and its stripper;

Fig. 7 is a plan view of a single cone cake adapted to be formed into a cone; and Fig. 8 is a perspective view of a cone as when made by means of the machine of the invention.

In the drawings, 10 denotes the base of the frame of the machine, 11 corner uprights supported thereon, 12 a top bed plate supported in the uprights, and 13 oppositely located side portions of the frame.

Extending upwardly from opposite ends of the bed plate are transversely arranged webs 14 and 15 by means of which the plate is secured to the uprights, and also extending upwardly from said plate and intermediate and parallel with end webs 14 and 15 is a web 16. Numerals 17—17 denote longitudinally arranged, spaced apart spindles slidably and rotatably mounted in webs 15 and 16, and numerals 18—18 denote conical shaped mandrels fixed upon the forward ends of the spindles and at all times positioned beyond web 15. The bed 12 is provided with an opening 19, and arranged thereon and between said opening and webs 15 and 16, respectively, are bearings 20 and 21 adapted to slidably and rotatably receive said spindles. Slidably keyed upon said spindles and arranged between bearings 20 and 21 are pulleys 22 upon which operating belts 23—23 are arranged.

24 denotes a driving belt which may receive its power from any suitable source, as from the operating mechanism, not shown, of a cone cake baking machine. This belt is designed to connect with and operate either of the three pulleys 25, 26 and 27 upon a stationary shaft 28 secured in brackets 29 attached to the frame of the machine. The central pulley 26 is an idler pulley, whereas pulley 25 serves to operate one of belts 23, said pulleys 25 and 27 each being secured to sleeves 30—30 also mounted upon shaft 28 and fixedly carrying smaller pulleys 31—31 about which belts 23—23 respectively, are also arranged. 32 denotes a bracket also secured to the frame and adapted to support a belt shifting device 33 which operates in a manner presently to be explained.

The mechanism for longitudinally reciprocating the spindles and their mandrels will now be described. 34 denotes a shaft suitably mounted to rotate in bearings 35 upon one of side portions 13 of the frame. 36 denotes a clutch mechanism operated by lever 36' and connecting shaft 34 with a rotatable shaft 37 bearing a bevel pinion 37' which is driven by an annular gear A' upon the underside of the planetary table of a cone cake baking machine as shown in part, in Fig. 2 and designated by reference character A. Upon the rear end of shaft 34 and arranged between bearings 35 is a bevel pinion 38 meshing with a bevel gear 39 fixed upon one end of a crank shaft 40 suitably journalled in side portions 13—13 of the frame and extending transversely across the body of the machine. The crank shaft includes two cranks, denoted by 41 and 42, respectively, and preferably arranged opposite each other in the manner shown. With more particular reference to Figs. 1, 2 and 3, numerals 43 and 44, respectively, denote crank levers pivoted upon a transverse cross-rod 45 secured in the base of the frame. Both of said crank levers are provided with duplicate circular cam slots 46—46 which are cut on a radius from the axis of the crank shaft as when the levers are forwardly positioned. These cam slots obviously freely receive the crank lever bearings 47 and 48, respectively, of the outer ends of the cranks which serve to throw the crank levers forward and backward.

The bed plate of the machine is also provided with longitudinally arranged opening 49, through which the upper portions of the crank levers extend, and the upper end of each crank lever is operatively connected with the before mentioned spindle 17. As shown, the rear end of each of these spindles includes a reduced portion 50 that extends though a cross-slide 51 and between said cross slide and spindle a coil spring 52 is arranged. Each crank lever is pivotally connected as at 53 to the cross slide to insure oscillation of the latter by the operation of the crank levers. The slides are each provided adjacent their opposite ends with holes 54 to freely receive guide rods 55, upon which said slides reciprocate. Two rods are provided for each cross-slide and are arranged longitudinally of the machine and positioned above the bed plate thereof and have their opposite ends supported by webs 14 and 16, respectively.

Referring more particularly to Figs. 1, 2 and 4, 56 denotes support rods extending forwardly from web 15 and having secured upon their free ends conical molds 57—57 with which the mandrels are adapted to co-operate to constitute cone formers. In Fig. 5 I have shown in detail the pair of molds constructed to co-operate with mandrels 18. The support rods are attached to extensions 58 of the conical molds and each mold is provided with a slot 59 extending longitudinally thereof and with a feed table 60 upon which the cone cakes B are successively placed to be fed through the slots into the molds and over the mandrel. Numeral 61 denotes a chute hung from the outer support rods 56 by means of metal hanger straps 62 and adapted to direct the finished cones when discharged from the mandrels in a manner to presently be explained.

When now shaft 34 is rotated to operate the crank shaft and its cranks, the crank levers, obviously, will be caused to oscillate, the reduced portions 47 and 48 of the cranks riding and rotating in the slots. As will also be obvious, by reason of the particular shape of the cam slots, lever 44 will not reach the extreme of its rearward movement when lever 43 reaches its forward extreme in position to operatively associate the corresponding mandrel with its mold, and vice versa, and each mandrel will remain in operatively associated position for some considerable period. That is to say, as each crank turns, to position a mandrel in a mold, the corresponding crank lever will be first oscillated to its extreme forward position when the engaging portion 48 of the crank will move through the cam slot in a manner to hold the lever, its rod and mandrel in its forward position, the operation being cushioned through the springs 52. During this operation the cone is first wound, then held and its edges stuck to prevent unwinding.

As will be seen from Figs. 1, 3 and 4, belt shifting lever 33 is pivoted at 63 upon bracket 32 and the rear end of said lever is provided with oppositely extending arms 64—64 adapted to be engaged by crank levers 43 and 44, respectively, when oscillated in the manner above set forth. The forward end of the belt shifting lever is associated with the shipper for the driving belt in any preferred manner. As shown, a guide rod 65 upon the machine frame has located thereon a slide bar 66 carrying downwardly extending pins 67 adapted to engage the driving belt and an upwardly extending pin 68 adapted to have operative connection with the forward end of the belt shifting device. It is to be understood that the oscillations of the crank levers will cause the belt shifting device to oscillate upon its pivot to alternately shift the driving belt from pulley 25 across pulley 26, and to pulley 27.

The method of operation of the parts of the machine controlled by shaft 34 has already been described. When now a cone cake B has been placed on a feed table so that one of its edges is inserted through the slot of the conical mold, and it is to be engaged by and wound over the mandrel in the mold, the driving belt will be positioned to cause one of the pulleys 25 or 27 to rotate, say, for example, pulley 27. This will cause one of the spindles and its mandrel as shown in the mold in Fig. 5 to rotate. As already stated, by reason of the cam slots 46 each crank lever reaches the extreme of its forward movement about the time the other crank lever reaches its rearward extreme. As shown, lever 43 is at the extreme of its forward movement and lever 44 is at its rearward extreme. As the crank shaft further rotates, crank lever 43 continues to be held in stationary position, while the reduced portion of the corresponding crank rides in the slot, but crank lever 44 moves hurriedly to position the corresponding mandrel into operative engagement with its conical mold. The driving belt, obviously, will remain in engagement with pulley 27 until crank lever 43 in its rearward movement engages its arm 64 of the belt shifting lever. The machine is so constructed and timed that this does not occur until after the cone C has been formed by rotation of the mandrel in the mold. The rotation then ceases and the coil spring presses and holds the stationary mandrel against the finished cone until its edges are united, as will be understood.

In the drawing I have shown the belt shifting device immediately after it has operated to shift the driving belt. As the operations continue, the crank in crank lever 43 first moves in the slot in said lever as already explained and then moves lever 43 to the extreme of its rearward movement, while, as already set forth, crank lever 44 moves to position its rotating mandrel in the other conical mold before crank lever 43 has reached the extreme of its movement. After both levers have reached the extreme of their movements to be positioned exactly opposite to the way they are shown, the cycle of operations then repeats itself.

Numeral 69 denotes strippers preferably supported by means of brackets 70 from support rods 56 and each provided with a spring pressed blade 71 adapted to slide upon the mandrels as they approach their rearward extremes to push the finished cones from said mandrels so that the cones can fall into the chute, under which a receptacle may be positioned, all of which will be apparent from Figs. 1 and 6 of the drawing without further description.

Having thus described the invention, what I claim and desire to secure by Letters Patent is:

1. In a cone making machine, the combination of a conical mandrel, a conical mold, means for longitudinally shifting said mandrel and means for rotating the same in said mold, and belt shifting means associated with both of said means already mentioned whereby said mandrel can be in non-rotating position in said mold to exert longitudinal pressure thereagainst.

2. In a cone making machine, the combination of a conical mandrel, a conical mold, means for longitudinally shifting said mandrel and means for rotating the same in said mold and to exert pressure thereagainst, and belt shifting means associated with both of said means already mentioned whereby said mandrel can be in non-rotating position in said mold to exert pressure thereagainst.

3. In a cone making machine, the combination of a conical mandrel, a conical mold, mandrel shifting means comprising a lever for longitudinally shifting said mandrel, and a crank adapted to oscillate said lever, a shiftable driving belt for rotating said mandrel in said mold, and belt-shifting means associated with said mandrel shifting means for causing said mandrel while in non-rotating position to exert pressure against said mold.

4. In a cone making machine, the combination of a plurality of conical mandrels, a conical mold adapted to cooperate with each mandrel, means for moving said mandrels into and out of said molds and means for rotating said mandrels while in said molds, whereby cones may be formed on said mandrels, and means for exerting pressure on said cones while in said mandrels and means for automatically removing said mandrels with their cones from said molds.

5. In a cone making machine, the combination of a plurality of conical mandrels, a conical mold for each mandrel, means for moving said mandrels into and out of said molds and means for rotating said mandrels while in said molds, whereby cones may be formed on said mandrels, means for sticking the cones while in said mold, means for removing said mandrels together with their cones from said molds, and strippers adapted to discharge said cones from said mandrels.

6. In a cone making machine, the combination of a plurality of conical mandrels, a conical mold for each mandrel, means for alternately rotating said mandrels and for alternately moving the same into operative engagement with said molds whereby cones may be formed upon said mandrels and out of operative engagement with said molds, and strippers adapted to discharge said cones from said mandrels when withdrawn from said molds.

7. In a cone making machine, a plurality of mandrels, a mold for each mandrel, means for alternately causing said mandrels and molds to be operatively associated to produce cones upon said mandrels, means for alternately withdrawing the mandrels longitudinally of their axes together with their cones from the molds, automatic means for stripping the cones from the mandrels when removed from the molds, and a chute supported upon said machine and adapted to receive said cones.

8. In a cone making machine, spindles mounted therein to have longitudinal movement, mandrels upon said spindles, conical molds upon said machine, said mandrel adapted to move axially into said molds to form a cone, means for rotating said spindles to wind cones upon said mandrels, means for stopping rotation of said spindles while said mandrels are in said molds, means for exerting pressure on the mandrels while in the molds, to seal the cones, and means for withdrawing said mandrels longitudinally of their axes, together with their cones from said molds.

9. In a cone making machine, spindles mounted therein to have longitudinal movement, mandrels upon said spindles, conical molds upon said machine, said mandrels adapted to move into said molds to exert pressure thereagainst, means for rotating said spindles to wind cones upon said mandrels, means for stopping rotation of said spindles and exerting pressure of said mandrels against said molds, means for withdrawing said mandrels together with their cones from said molds, and strippers upon said machine to automatically remove said cones from said mandrels.

10. A machine for making cones, comprising a base with uprights, a bed plate supported by said uprights, bearings upon said bed plate, spindles slidably and rotatably mounted in said bearings, mandrels upon said spindles, means for alternately rotating said spindles, a conical mold for each mandrel, and means for alternately moving said mandrels into and out of operative engagement with said molds, said last mentioned means including crank levers having slots and connected to said spindles, a crank shaft having two cranks, one in each slot, and a gear and pinion driving connection for rotating said crank shaft.

11. A machine for making cones, comprising a base with uprights, a bed plate supported by said uprights, bearings upon said bed plate, spindles slidably and rotatably mounted in said bearings, mandrels upon said spindles, means for alternately rotating said spindles, a conical mold for each mandrel, and means for alternately moving said mandrels into and out of operative engagement with said molds, said last mentioned means including crank levers having curved slots and attached to said spindles and pivoted upon said base, a crank shaft having two cranks, one in each slot, and rotating means for said crank shaft.

12. A machine of the character described, comprising a base, with uprights, a bed plate supported by said uprights, spindles slidably and rotatably mounted upon said bed plate, mandrels upon said spindles, a conical mold for each mandrel, means for alternately moving said mandrels and molds into and out of operative engagement, said means including crank levers pivoted upon said base, fixed to said spindles and having curved slots, and a rotatable crank shaft having two cranks, one for each slot, and means for alternately rotating said spindles, said rotating means including pulleys slidably keyed to said spindles, operating belts upon said pulleys, a fixed shaft upon said machine and carrying a pair of pulleys over each of which said operating belts, respectively, extend, a driving belt adapted to operate either pulley member, and a belt shifting device for controlling said driving belt.

13. A machine as specified in claim 12, wherein the belt shifting device comprises a member pivoted at its center, having its front end secured to a belt shipper for said driving belt, and its rear end terminating in arms adapted to be alternately engaged by said crank levers to manipulate said shipper.

14. A cone forming machine comprising a pair of conical molds, of a pair of mandrels adapted to be operatively associated with said molds, spindles upon which the mandrels are carried, means for alternately reciprocating the spindles and mandrels to alternately position the mandrels in the molds and means for rotating the spindles and mandrels while the latter are in the molds.

Signed at Bridgeport in the county of Fairfield and State of Connecticut this 10th day of February, A. D., 1921.

HARRY G. TATOSIAN.

Witnesses:
CASPER M. TATOSIAN,
C. M. NEWMAN.